March 11, 1941.    T. J. KELLEHER    2,234,178
BENDING BRAKE
Filed Jan. 14, 1938    5 Sheets-Sheet 1

Inventor:
Thomas J. Kelleher
By: Stevens & Batchelor
Atty's.

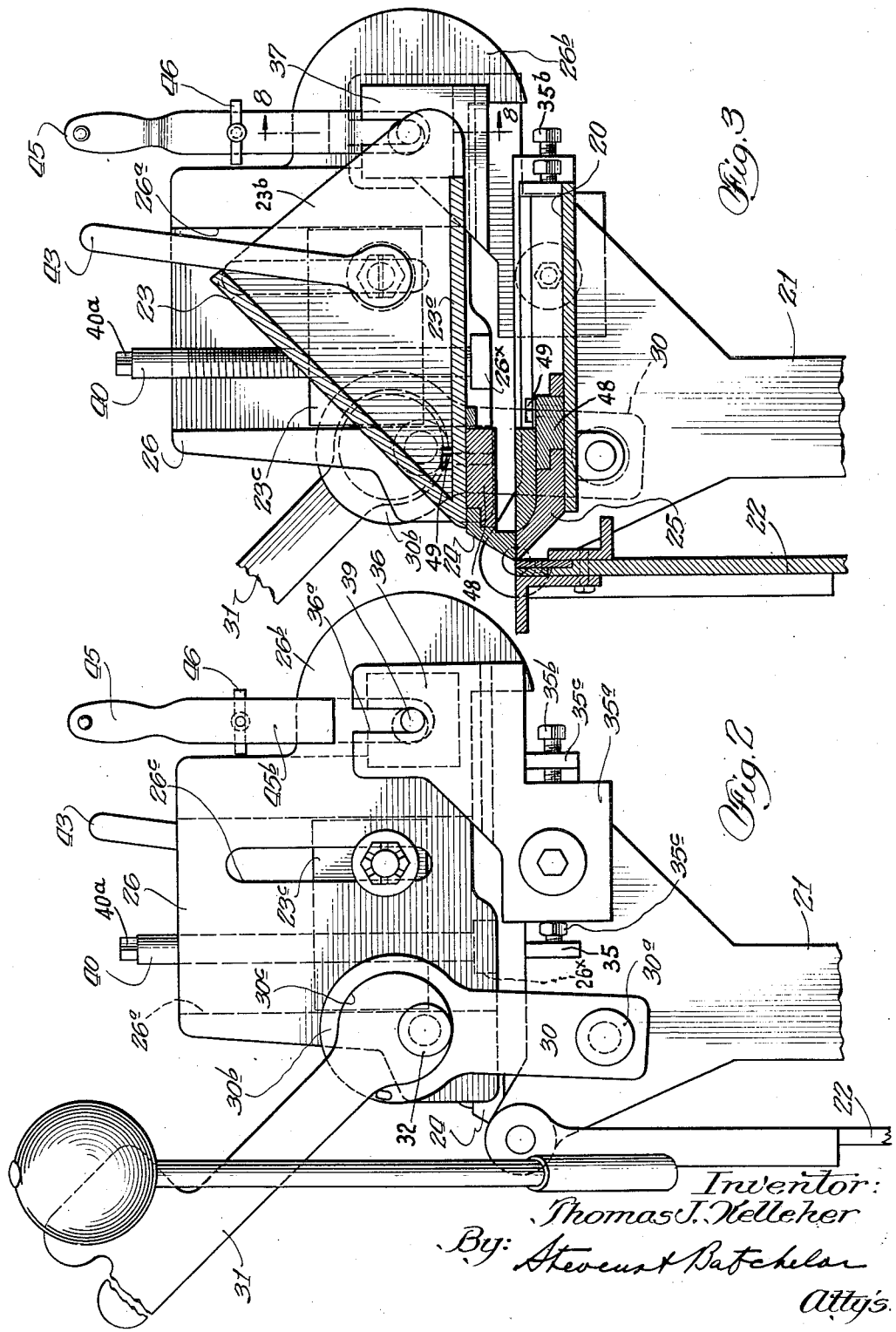

March 11, 1941. T. J. KELLEHER 2,234,178
BENDING BRAKE
Filed Jan. 14, 1938  5 Sheets-Sheet 3
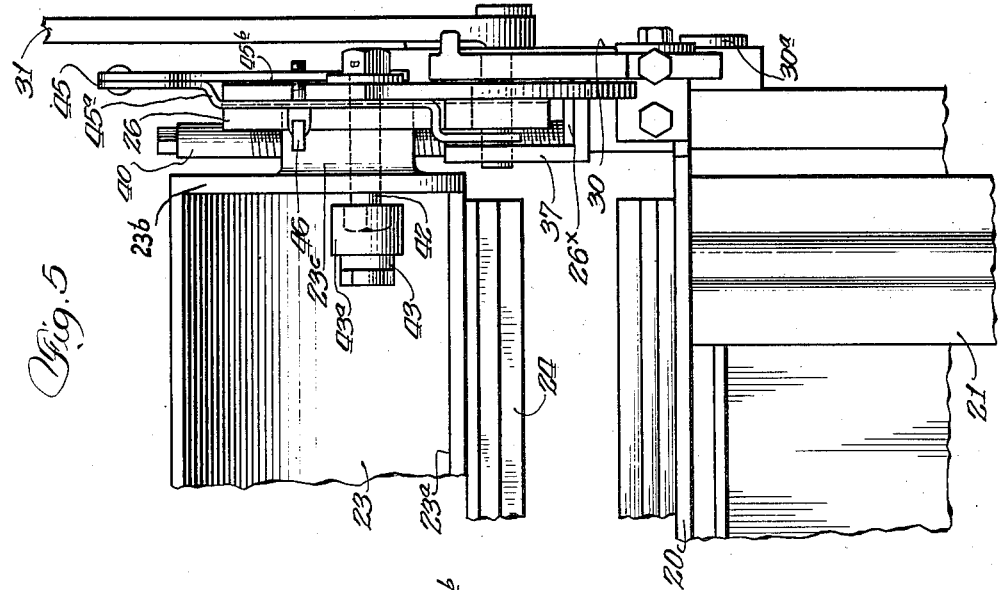
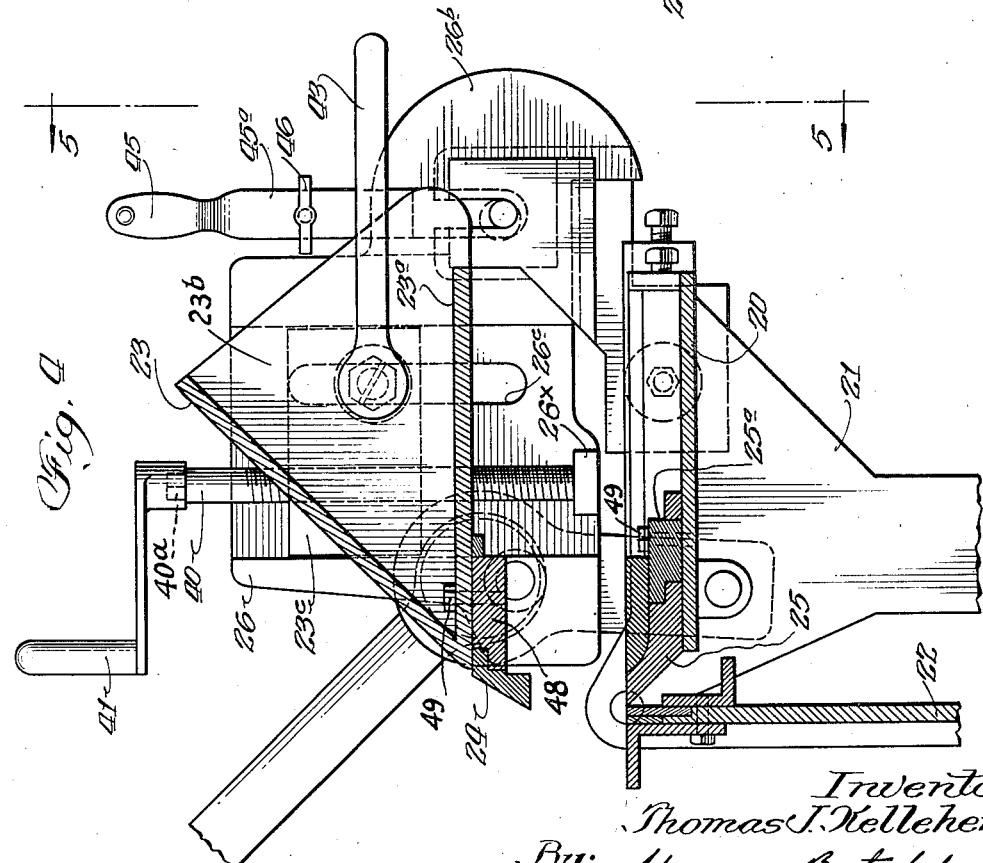
Inventor:
Thomas J. Kelleher
By: Stearns Batchelor
Attys March 11, 1941.  T. J. KELLEHER  2,234,178
BENDING BRAKE
Filed Jan. 14, 1938  5 Sheets-Sheet 4
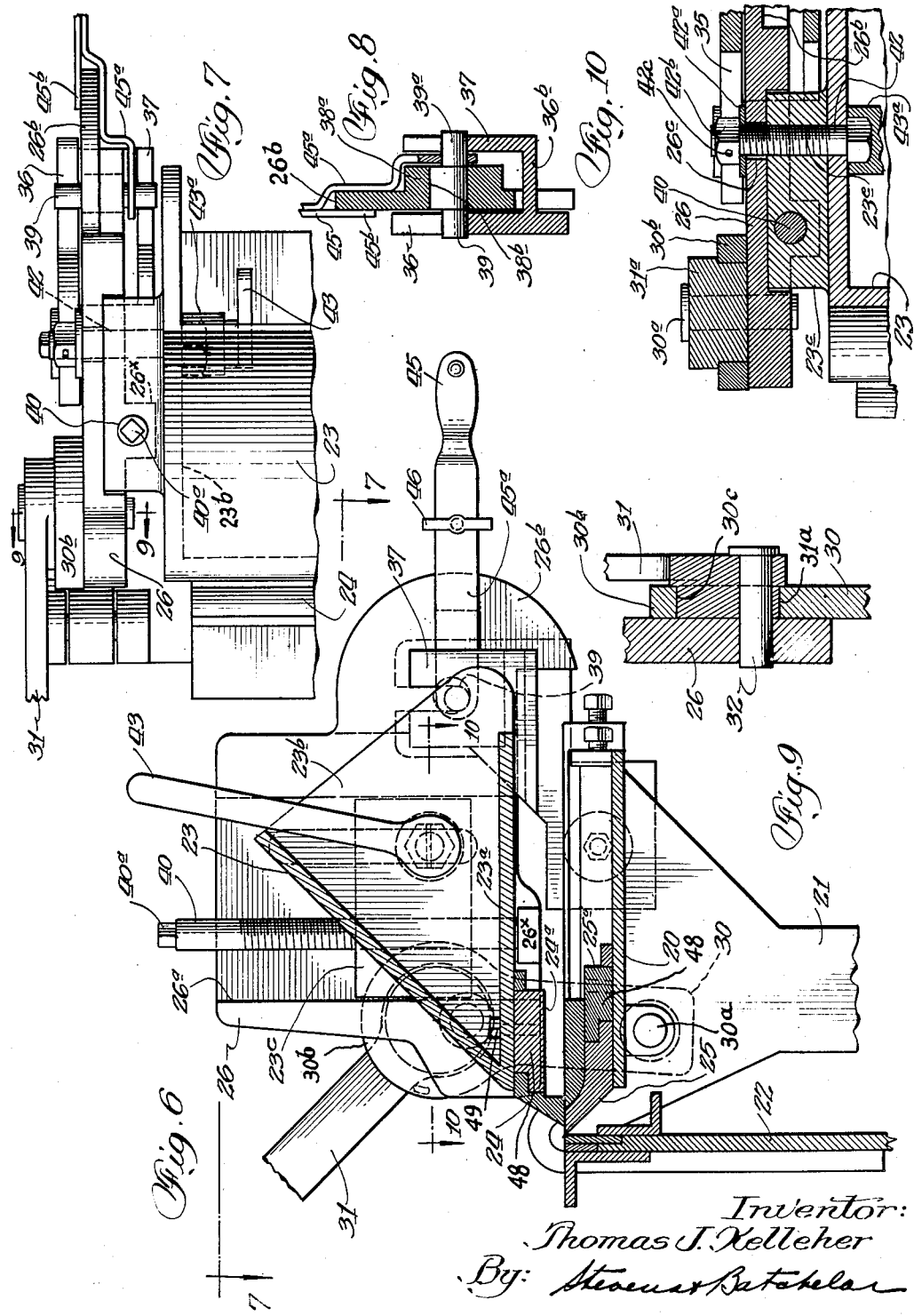
Inventor:
Thomas J. Kelleher
By: Stevens & Batchelor
Atty's.

Inventor:
Thomas J. Kelleher
By: Stevens & Batchelor
Attys.

Patented Mar. 11, 1941

2,234,178

UNITED STATES PATENT OFFICE 2,234,178

BENDING BRAKE

Thomas J. Kelleher, Chicago, Ill.

Application January 14, 1938, Serial No. 185,043

5 Claims. (Cl. 153—16)

My invention relates to bending brakes, and more particularly to the type in which a rotatable lower leaf is operated by hand in relation to an upper leaf, and my main object is to provide a brake in which the upper leaf may be elevated to a considerable height for adaptation to special types of work.

A further object of the invention is to incorporate in the novel brake an adjustment to offset the upper leaf from the lower one in a rearward direction, whereby to render the jaws of the brake adaptable for certain types of work or peculiarities therein.

A still further object of the invention is to provide a yieldable type of support for the forward portion of the upper leaf in order to properly dispose the same for the offset adjustment.

Another object of the invention is to combine in the novel brake a set of supporting and operative units which are simple, rugged in construction and easily handled.

With the above objects in view, and with any others that may suggest themselves from the description to follow, a better understanding of the invention may be had by reference to the accompanying drawings, in which Fig. 1 is an elevation of the brake, partly broken away;

Fig. 2 is an end view of the main portion thereof taken from the right-hand side of Fig. 1;

Fig. 3 is a section taken on the line 3—3 of Fig. 1, the upper leaf of the brake being shown in the low or normal position;

Fig. 4 is a view similar to Fig. 3, showing the upper leaf in the elevated position;

Fig. 5 is an elevation of a portion of the brake as seen from the rear or viewed from the line 5—5 of Fig. 4;

Fig. 6 is a view similar to Fig. 3, showing the parts positioned when the upper leaf is in the offset position;

Fig. 7 is a top plan view of a portion of the brake as viewed from the line 7—7 of Fig. 6;

Fig. 8 is a section on the line 8—8 of Fig. 3;

Fig. 9 is a section on the line 9—9 of Fig. 7;

Fig. 10 is a section on the line 10—10 of Fig. 6;

Figure 1:
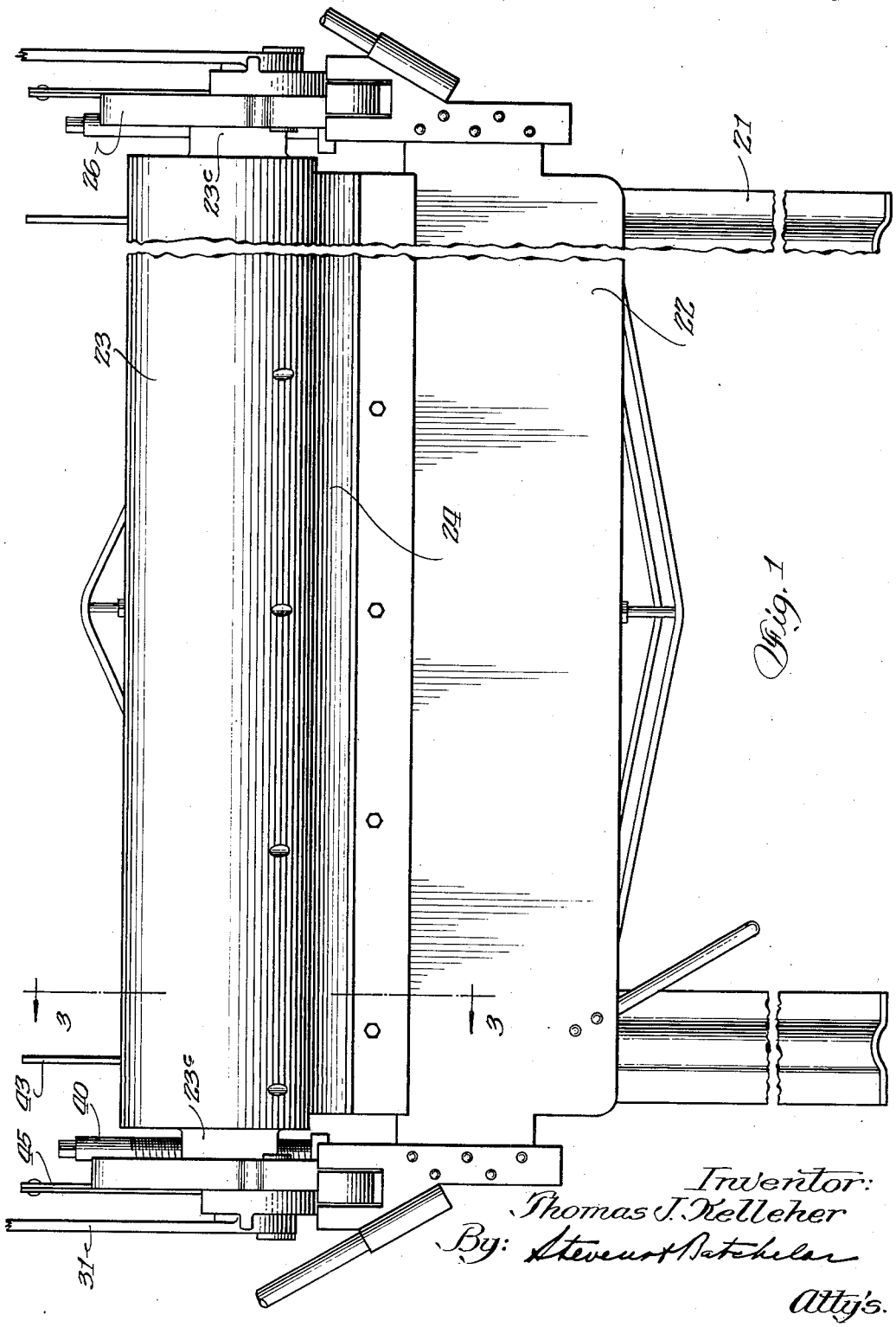

Along fundamental lines, the improved brake is of standard construction. Thus, specific reference to the drawings indicates the bed at 20, the end supports or legs at 21, the rotatable leaf at 22, the upper leaf at 23, the upper jaw at 24, the lower jaw at 25, the bottom of the upper leaf at 23a, and the clamps for the jaws at 24a and 25a.

Whereas the upper leaf in the standard bending brake is pivotally disposed at the rear to open and close at the front in relation to the work, the leaf in the present instance also undergoes a direct vertical movement, and therefore requires a special support. This support is provided by a pair of side walls 26 disposed in proximity to the sides of the leaf 23 and having vertical slots 26a on their inner sides. The faces 23b of the leaf 23 are formed with projecting blocks 23c which are slidable in the slots 26a, whereby to make it possible to raise or lower the upper leaf 23 in relation to the side walls 26.

The walls 26 are supported from the standards or legs 21 as indicated in Fig. 2. Thus, at the front the support is in the form of a pair of links 30 which are pivoted with their lower ends to the supports 21 by means of pins 30a. The upper portion of each link is enlarged to form a circular head 30b having a similar opening 30c in which is rotatably disposed the hub 31a of an arm 31 whose function is to open and close the upper leaf of the brake at the front as in the standard forms of bending brakes. The hub is eccentrically mounted to rotate on a pin 32 which is driven into the wall 26. Thus, the swing of either arm 31 induces the rise or fall of the related wall 26 in respect to the corresponding link 30.

At the rear, each support 21 carries spaced brackets 35 for the initial setting of a block 35a between forward and rearward positions by means of a screw 35b and lock nut 35c, such a setting being common to standard bending brakes. However, for the present purpose the block 35a is upwardly extended with a bearing portion 36 which is transversely slotted from the top as indicated at 36a. The extension has an inward shelf 36b terminating with an upward bracket 37 also slotted from the top and parallel to the extension 36. Between the extension 36 and the bracket 37 is disposed the hub portion 38a of a rearward extension 26b of the particular side wall 26, such hub portion having a horizontal bore 38b for an eccentric medial enlargement 39a of a pin 39, the end portions of the latter being journaled in the slots of the parts 36 and 37. Thus, the pin 39 serves to support the rear portion of the related wall 26 in the bearing extensions 36 and 37.

It was mentioned before that the upper leaf 23 is vertically movable in the guiding slots 26a of the side walls 26 by means of the blocks 23c. This movement is regulated by vertically tapping such blocks for the threading of screws 40. The lower ends of the screws are supported on inward lugs 26x of the walls 26, while the upper ends of the screws have angular extensions 40a for the application of a crank handle 41 as indicated in Fig. 4. The screws rest on the lugs 26x from the weight of the leaf 23, such weight serving to steady the latter during its rise and fall as the screws 40 are turned. One of these may be turned at a time if desired, whereby to raise or lower the corresponding side of the leaf.

In order that the upper leaf 23 may be secured at any point in its vertical travel, the leaf sides 23b and corresponding blocks 23c are horizontally tapped at 23e for the threading of bolts 42 from the inside. The head of each bolt receives a socket 43a formed by the hub of a lever 43 occurring along the inner side of the leaf side 23b. Each bolt 42 passes freely through a vertical slot 26c of the related side wall 26, receiving a washer 42a and a nut 42b locked merely in contact with the washer by a pin 42c. Thus, it is the province of each lever 43 to retract its bolt 42 when swung forwardly from the position of Fig. 4 to that of Fig. 6, this action drawing the nut tightly against the washer 42a and securing the leaf 23 to the corresponding wall 26; and the levers are of course thrown back when these members are to be released. It will be understood that the threads of the two bolts 42 will have to be in reverse directions in order that the same effect will be had on both bolts when their levers are similarly actuated. It follows, therefore, that when the upper leaf has been raised to the desired height, drawing the levers 43 forward will tighten the leaf to the end walls 26.

It was stated in a previous section that each pin 39 forms a support for its wall 26 when journaled in the parts 36 and 37, as shown in Fig. 8. However, by means of the eccentric enlargement 39a, the pin can be made to impart a movement to such wall when the pin is rotated. While the movement may incidentally be a vertical one, its lateral course is utilized for the present purpose. Thus, the rotation of the pins from the position of Fig. 2 to that of Fig. 6 serves to draw the walls 26 from front to rear whereby to carry the upper bending leaf 23 accordingly. It is now seen that the jaw 24 has receded from a meeting point with the jaw 25 at the front edge to a position to the rear of such front edge. In a brake of conventional size, this movement is approximately one-quarter of an inch.

The movement of each pin 39 is effected by a lever 45 which has one branch 45a secured to the pin, while the other branch 45b straddles the wall extension 26b. The branches are perforated crosswise to receive a thumb screw 46, the same passing freely through the branch 45a and threading through the branch 45b. Thus, the advance of the thumb screw causes the branches to frictionally engage the wall extension 26b at any point to which the lever 45 has been swung whereby to fix the adjustment of the leaf jaw 24.

In accordance with the operation of a conventional bending brake, the arms 31 are swung back from the position of Fig. 2 to raise the jaw 24 when the work is to be inserted between the same and the jaw 25. When this has been done, the bending leaf is operated in the usual manner. The lift of the jaw 24 is of course limited; and the blocks 35a are originally set to place the jaws 24 and 25 edge to edge.

Figure 11:
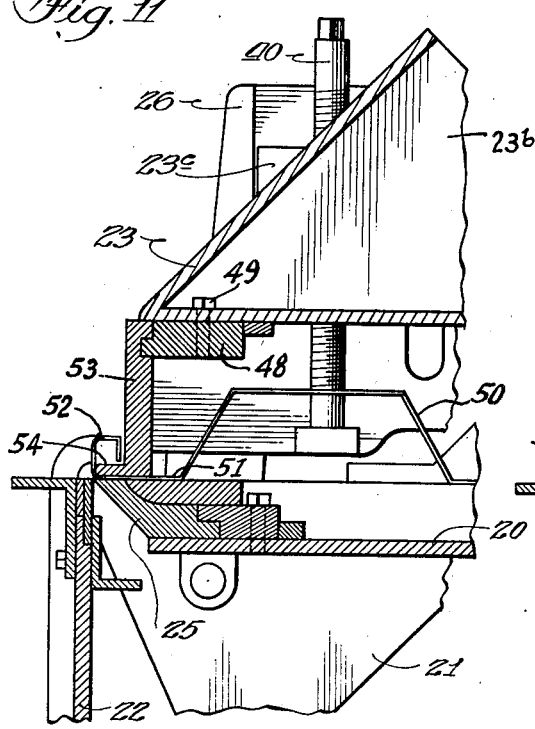
Figs. 11, 12 and 13 are views similar to Fig. 4, showing the types of work to which the elevated upper leaf of the brake is adaptable.
Figure 12:
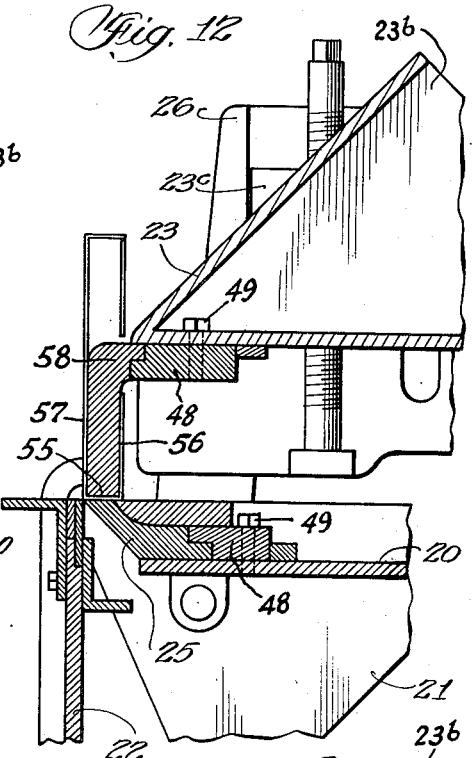
Figure 13:
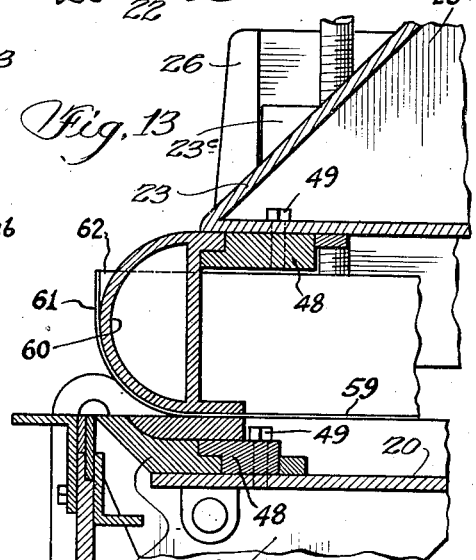

The jaws in the improved brake are preferably secured by clamps 48 to the supporting parts 23a and 20 by means of bolts 49. The jaws are therefore interchangeable for others of different profile or function. Where the work is of such height as to require vertical clearance, this cannot be obtained in the conventional bending brake, but is readily feasible in the improved brake by applying the crank handle 41 to each of the screws 40 until the proper lift has been attained. Thus, Fig. 11 shows this adjustment made to clear an arch 50 in the rear portion of a sheet 51, whose fore part 52 has been formed into a tube, the jaw 53 being tall and having a foot 54 to allow the work clearance. Fig. 12 shows another instance where the work sheet 55 had a tall back wing 56 and requires an up-bend 57 parallel to the same. The special jaw 58 for this purpose also requires the extra clearance above the jaw 25, secured by raising the upper leaf 23 as described. A still further instance is indicated in Fig. 13, where the work 59 was raised during the bending operation to follow the profile of a curved jaw 60. In this case, vertical clearance was required not only by the bent portion 61, but also by the side wall 62 of the work sheet.

Figure 14:
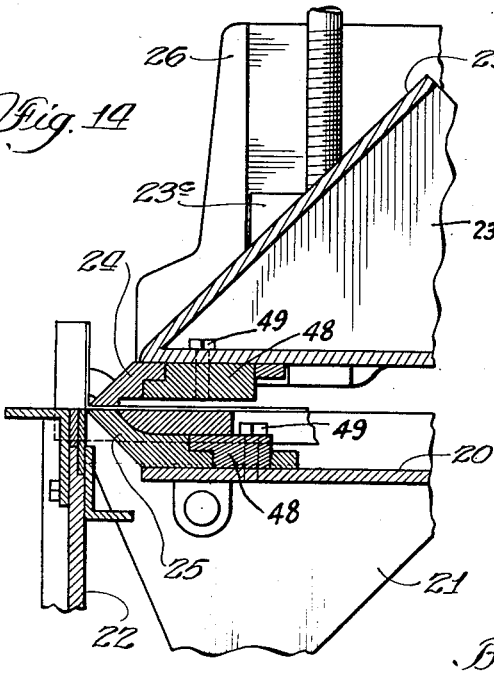
Fig. 14 is a view similar to Fig. 6, showing the application of the offset upper leaf.

An illustration of the front and back adjustment of the jaw 25, described in connection with Fig. 6, is seen in Fig. 14. Ordinarily, the gage of the sheet to be bent is limited because the jaws 24 and 25 at edge-to-edge position do not offer sufficient clearance for a thicker sheet, being subjected to strain if such a sheet is inserted. However, if the jaw 24 is offset in a rearward direction a short distance or space, the heavier sheet finds the necessary room or clearance. The adjustment of the jaw could be made by means of the screws 35b and lock nuts 35c, but this would take long and would disturb the original setting of the mechanism. Hence, the adjustment by means of the lever 45 procures the desired recession of the jaw 24 to admit of bending a thicker sheet, as suggested in Fig. 14.

It will be evident from the above description that the improved bending brake includes two major advancements, namely, an upper leaf which has a high elevating capacity, and an upper leaf support which is horizontally adjustable. However, these are not separate units, but combine with the regular mechanism of the brake in a simple and logical relation. This occurs by the common function of the walls 26 between the upper leaf control and the upper leaf on one hand, and between the framework of the machine and the upper leaf on the other hand. An assembly is thus had which is in harmony with the existing controls and functions of the machine and occasions no radical departure from the design thereof.

While I have described the invention along specific lines, various minor changes or refinements may be made therein from time to time without departing from its principle, and I consider all such changes and refinements as coming within the scope and spirit of the appended claims.

I claim:

1. In a bending brake having a bed and an upper leaf over the same, means to raise and lower the latter comprising walls alongside the leaf and formed with vertical recesses along their inner sides, blocks extended laterally from the leaf into the recesses and having tapped vertical bores, inward lugs from the walls below the blocks, and screws threaded downwardly through the bores in the blocks to meet the lugs as supports and induce the rise or fall of the leaf when the screws are turned accordingly.

2. A bending brake having a bed, an upper leaf over the same, and means to adjust the leaf vertically comprising walls alongside the leaf and formed with vertical slots, bolts threaded through the sides of the leaf and passing freely through the slots, and stops on the protruding portions of the bolts and effective to clamp the walls to said sides on the rotation of the bolts in the corresponding directions and a wrench-engaging head formed on the inner end of said bolt.

3. A bending brake having a bed, side walls over the same and horizontally pivoted with their rear portions to the bed, an upper leaf vertically adjustable between the side walls, the latter having horizontal perforations in the pivoting regions, pivot pins carried by the bed and having eccentric portions in said perforations, and means to rotate the pins and cause their eccentric portions to adjust the walls between front and rear positions.

4. A bending brake having a bed, upward brackets at the rear of the latter and formed with pockets, side walls alongside the brackets and having perforations in line with the pockets, pivotal supports for said walls comprising pins resting in the pockets and including eccentrics disposed in said perforations, such eccentrics being effective to move the walls between front and rear positions when the pins are turned, and an upper leaf vertically adjustable between the side walls.

5. The structure of claim 4, rearward guides extended from said walls, levers carried by the pins and straddling said guides, and clamps carried by the levers and effective to secure them to said guides at positions to which swung while turning the pins.

THOMAS J. KELLEHER.